US005572783A

United States Patent [19]

Wacker

[11] Patent Number: 5,572,783

[45] Date of Patent: Nov. 12, 1996

[54] METHOD FOR UTILIZING A ROD COUPLING TOOL FOR COUPLING AND DISASSEMBLING RODS IN A SUCKER ROD STRING

[75] Inventor: Samuel L. Wacker, Roosevelt, Utah

[73] Assignee: GCW Development, Bluebell, Utah

[21] Appl. No.: 433,673

[22] Filed: May 4, 1995

Related U.S. Application Data

[62] Division of Ser. No. 132,788, Oct. 7, 1993, Pat. No. 5,433,128.

[51] Int. Cl.$^6$ ...................................................... B23P 19/04

[52] U.S. Cl. .......................... 29/426.5; 29/237; 81/57.34

[58] Field of Search ............................... 29/426.1, 426.5, 29/525, 237, 240; 81/57.34, 57.35, 57.16, 57.24

[56] References Cited

U.S. PATENT DOCUMENTS

| | | | |
|---|---|---|---|
| 3,802,057 | 4/1974 | Porter | 29/426.5 |
| 4,345,493 | 8/1982 | Rassieur | 81/57.34 |
| 5,010,635 | 4/1991 | Clark | 29/237 X |
| 5,040,438 | 8/1991 | Rousseau | 81/57.35 |

*Primary Examiner*—Peter Vo
*Assistant Examiner*—Khan V. Nguyen
*Attorney, Agent, or Firm*—J. Winslow Young

[57] ABSTRACT

A sucker rod coupling tool and method for either breaking or tightening the threaded joint between a sucker rod and the coupling that joins the sucker rod to the next sucker rod. A base plate has a backup wrench mounted to one end and a friction wrench actuated by a hydraulic piston pivotally affixed to the base plate at the other end. An inversion loop is affixed to the base plate and rotatably suspended below a control platform to accommodate inversion of the base plate along with the backup wrench and the friction wrench. The control platform also supports the control levers and can be raised and lowered to allow the backup wrench to engage the sucker rod.

3 Claims, 3 Drawing Sheets

METHOD FOR UTILIZING A ROD COUPLING TOOL FOR COUPLING AND DISASSEMBLING RODS IN A SUCKER ROD STRING

RELATED APPLICATIONS

This application is a Divisional application of my application Ser. No. 08/132,788 filed 7 Oct. 1993 for SUCKER ROD COUPLING TOOL AND METHOD now U.S. Pat. No. 5,433,128 issued 18 Jul. 1995.

BACKGROUND

1. Field of the Invention

This invention relates to rod coupling tools and, more particularly, to a hydraulic tool apparatus for breaking and/or tightening the couplings in a sucker rod string.

2. The Prior Art

A producing oil well includes a number of systems for pumping the oil from the bottom of the oil well to the surface. The oil well itself is defined by a steel casing extending from the surface through the production zone. The purpose of the casing is to protect the integrity of the hole bored into the earth and to provide the basic unit of the production string. The production string consists of a production tubing, a tubing anchor, a seating nipple, a rod pump, and a sucker rod string. The production tubing is secured to the casing by the tubing anchor while the rod pump is set in the seating nipple and actuated by the sucker rod string to pump oil upwardly through the production tubing.

The sucker rod string is interconnected between the walking beam of a pump jack located at the wellhead and the rod pump at the bottom of the oil well. The sucker rod string is moved in a reciprocatory manner to actuate the rod pump. Various devices are used on the production string to assure the proper tensile forces are imposed on the production tubing to minimize undue stresses and wear on the sucker rod string during this reciprocatory motion. Further, a rod rotator is mounted to the walking beam to impart a rotational force on the sucker rod string each time the sucker rod string is moved downwardly. This rotational force is directed to the right so as to apply a continuous tightening effect on the couplings between the individual sucker rods in the sucker rod string.

Each sucker rod is about 25 feet long and is configured with a male-threaded, pin end at each end and is coupled to the next sucker rod by a rod coupling. The rod coupling is fabricated as a cylindrical length of hardened steel about 3 to 4 inches long with a female thread coaxially located in each end. The foregoing rotational force imposed on the sucker rod string is designed to impose a continual tightening force on the threaded joints between each sucker rod and its respective coupling.

Periodically, it becomes necessary to remove the sucker rod string from the oil well for servicing. A workover rig is brought to the well head and serves as the support structure to accommodate removal and servicing of the sucker rod string and the associated elements in the production string. The sucker rod string is pulled from the production string one sucker rod at a time. As each rod coupling is brought to the surface, one of the joints between the rod coupling and the sucker rod at each end of the rod coupling is uncoupled using the rod tongs of the workover rig. The rod tongs are designed to engage the respective ends of the sucker rod at each end of the rod coupling and cause one or the other sucker rod to become uncoupled from the rod coupling. At this point the rod coupling must than be removed from the other sucker rod in order to allow it to be replaced with a new rod coupling. As each rod coupling is replaced, it is reassembled to the same sucker rods to assure that each sucker rod is returned to its original position in the sucker rod string. Three lengths of the reassembled sucker rod are then stacked sequentially in the rod basket of the workover rig and held there until reassembled and lowered into the production tubing in the exact sequence as they were originally. Each length of three sucker rods is referred to in the industry as a pull and each pull may have an interconnecting rod coupling on either the bottom or top of the pull, depending on how that particular joint broke when uncoupled using the rod tongs.

The foregoing sequence of uncoupling the sucker rods from the rod coupling using the rod tongs and then a friction wrench to remove the rod coupling from the remaining sucker rod would appear to be a fairly routine procedure. However, the foregoing rotational forces imposed on the sucker rod string during the pumping action create a very tight engagement between the coupling and the respective sucker rods. Further, since the rod tongs will inherently have uncoupled the easier of the two joints between the respective sucker rods and the rod coupling, one on each end of the rod coupling, it necessarily means that the most difficult of the two joints must now be uncoupled by hand using the foregoing friction wrench.

Each end of the sucker rod is provided with a wrench engagement surface configured with a square external profile that is easily and securely held by the rod tongs or a dimensionally configured wrench. The rod coupling, on the other hand, is a cylindrical surface so that it requires a special friction wrench that grips the coupling more tightly as more force is applied to the wrench. In practice, it is customary for the oil field workers to slip a length of pipe (called a "cheater pipe") over the handle of the friction wrench in order to increase the leverage on the friction wrench. Generally, two or even three workers will grasp the cheater pipe in order to impose sufficient force to break the threaded joint between the sucker rod and the coupling. Not only does this procedure require extra time, but it frequently results in injury to the workers if the friction wrench slips or the threaded joint breaks unexpectedly.

In view of the foregoing, it would be an advancement in the art to provide a rod coupling tool for easily and safely opening as well as tightening the threaded joint between a coupling and a sucker rod. It would also be an advancement in the art to provide a hydraulic rod coupling tool wherein all the forces imposed on the threaded joint are applied using a hydraulic system. Another advancement in the art would be to provide a hydraulic rod coupling tool that can be readily inverted to adapt the rod coupling tool to a change in the orientation between the rod coupling and the sucker rod. It would also be an advancement in the art to provide a rod coupling tool for tightening the threaded joint between a rod coupling and a sucker rod. Such a novel apparatus and method is disclosed and claimed herein.

BRIEF SUMMARY AND OBJECTS OF THE INVENTION

The present invention is a novel, hydraulic system for either breaking or tightening the threaded joint between a rod coupling and a sucker rod. A backup wrench for releasably engaging the square profile on the shank of the sucker rod is mounted to a base plate and serves to securely affix the sucker rod against rotation. A friction wrench is releasably engaged to the rod coupling and is actuated by a wrench hydraulic piston mounted at one end to the base plate at a position spaced from the backup wrench. The base plate with the backup wrench, the wrench hydraulic piston, and the friction wrench can be readily inverted to accommodate other rod coupling/sucker rod orientations. The entire assembly can be raised and lowered by an elevational hydraulic piston. The hydraulic controls are mounted to the base of the elevational hydraulic piston where they are readily accessible and are not affected by inversion of the base plate and its associated equipment.

It is, therefore, a primary object of this invention to provide improvements in rod coupling apparatus.

Another object of this invention is to provide improvements in the method of either breaking or tightening the threaded joint between a rod coupling and a sucker rod.

Another object of this invention is to provide a hydraulic system for either breaking or tightening the threaded joint between a rod coupling and a sucker rod.

Another object of this invention is to provide a hydraulic system for either breaking or tightening the threaded joint between a rod coupling and a sucker rod wherein the entire actuator assembly can be inverted in order to accommodate a reversed orientation between the rod coupling and the sucker rod.

Another object of this invention is to provide a hydraulic system for either breaking or tightening the threaded joint between a rod coupling and a sucker rod wherein the entire assembly is suspended from an elevational system.

Another object of this invention is to provide a hydraulic piston for raising and lowering the hydraulic mechanism.

These and other objects and features of the present invention will become more readily apparent from the following description in which preferred and other embodiments of the invention have been set forth in conjunction with the accompanying drawing and appended claims.

DETAILED DESCRIPTION OF THE PREFERRED EMBODIMENT

Figure 1:
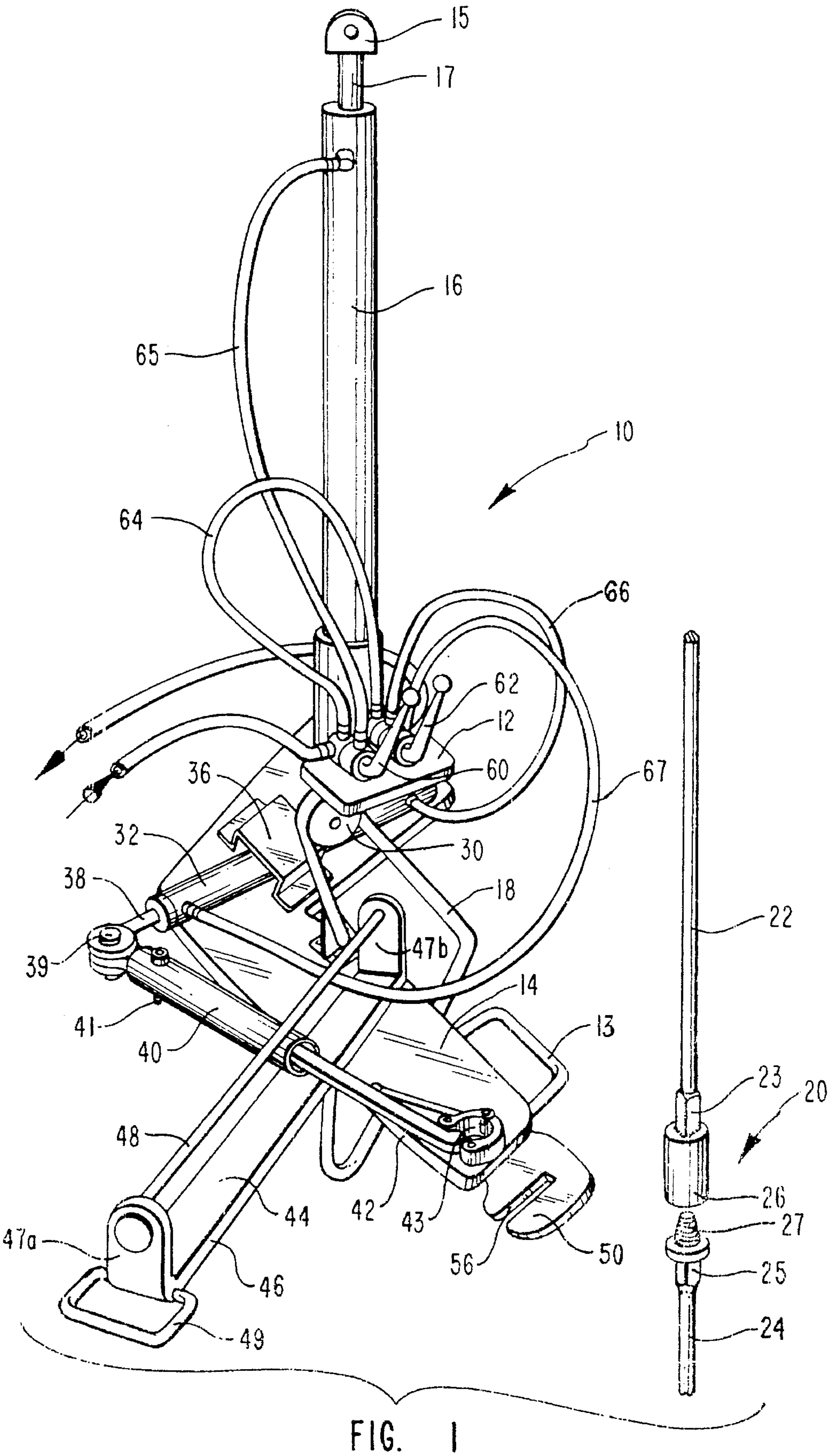
FIG. 1 is a perspective view of the novel rod coupling tool of my invention shown in the environment of a portion of a conventional sucker rod string.

The invention is best understood by reference to the drawing wherein like parts are designated by like numerals throughout in conjunction with the following description.

GENERAL DISCUSSION

This invention is a portable, hydraulically powered tool for use in either breaking or tightening the threaded joint between a rod coupling and a sucker rod. The hydraulic power is supplied from any suitable source such as a conventional hydraulic pump powered by an internal combustion engine. The tool is configured to be suspended from the overhead derrick structure of the workover rig with the suspension point being an upper end of an elevational hydraulic piston. This elevational hydraulic piston enables the operator to easily adjust the operating height of the tool.

The tool itself includes two basic components, a control platform and a base plate to which the various operative elements of the tool are attached. These operative elements include a backup wrench, a guide, and a hydraulically powered friction wrench. The guide controls the lateral movement of the friction wrench and supports the same when the base plate is inverted. The base plate is suspended below the control platform by a rollover bar engaged to a roller under the control platform. The rollover bar is configured with a triple lobe configuration to allow the base plate to be selectively inverted to reverse the relative orientation of the backup wrench and the friction wrench with respect to the sucker rod and the rod coupling. An intermediate lobe orients the base plate in the vertical plane to enable the tool to be used on a sucker rod and rod coupling combination oriented horizontally.

The ability to easily invert the tool is important since it is uncertain whether the rod coupling will break from the upper sucker rod or the lower sucker rod when the each joint is broken by the rod tongs. Advantageously, the rod coupling tool can also be used during reassembly of the sucker rod string to assure that each of the reset joints between the pulls in the sucker rod string are suitably tightened prior to the sucker rod string being lowered into the production string.

DETAILED DESCRIPTION

Referring now to FIG. 1, the novel rod coupling tool of this invention is shown generally at 10 and in the environment of a fragmentary portion of a conventional sucker rod string shown generally at 20. Sucker rod string 20 includes an upper or first sucker rod 22 and a lower or second sucker rod 24 with a rod coupling 26 interposed between first sucker rod 22 and second sucker rod 24. Second sucker rod 24 is shown uncoupled from rod coupling 26 to reveal threaded pin 27 which is threaded with male threads configured to threadedly engage corresponding female threads (not shown) formed coaxially in the abutting end of rod coupling 26. Each of first and second sucker rods 22 and 24 include a wrench shank 23 and 25, respectively, for engagement of the respective sucker rod by the conventional rod tongs (not shown) as well as by a backup wrench 50 as will be discussed more fully hereinafter.

Wrench shanks 23 and 25 are each configured with a square profile for secure engagement with backup wrench 50. Rod coupling 26 is fabricated from a specially hardened steel and provided with a cylindrical profile since rod coupling 26 is designed to act as the wear surface rather than sucker rod string 20 during its aforedescribed reciprocatory action in the event problems are encountered downhole causing sucker rod string 20 to abrade the production string (not shown).

Rod coupling tool 10 consists of two basic components, control platform 12 and base plate 14. Control platform 12 is mounted on the lower end of an elevational hydraulic piston 16. Base plate 14 is suspended below control platform 12 by a rollover bar 18 engaged in a roller 30. Roller 30 is mounted on the bottom of control platform 12 and acts as a single point suspension for rollover bar 18 and base plate 14 to which rollover bar 18 is mounted.

Figure 2:
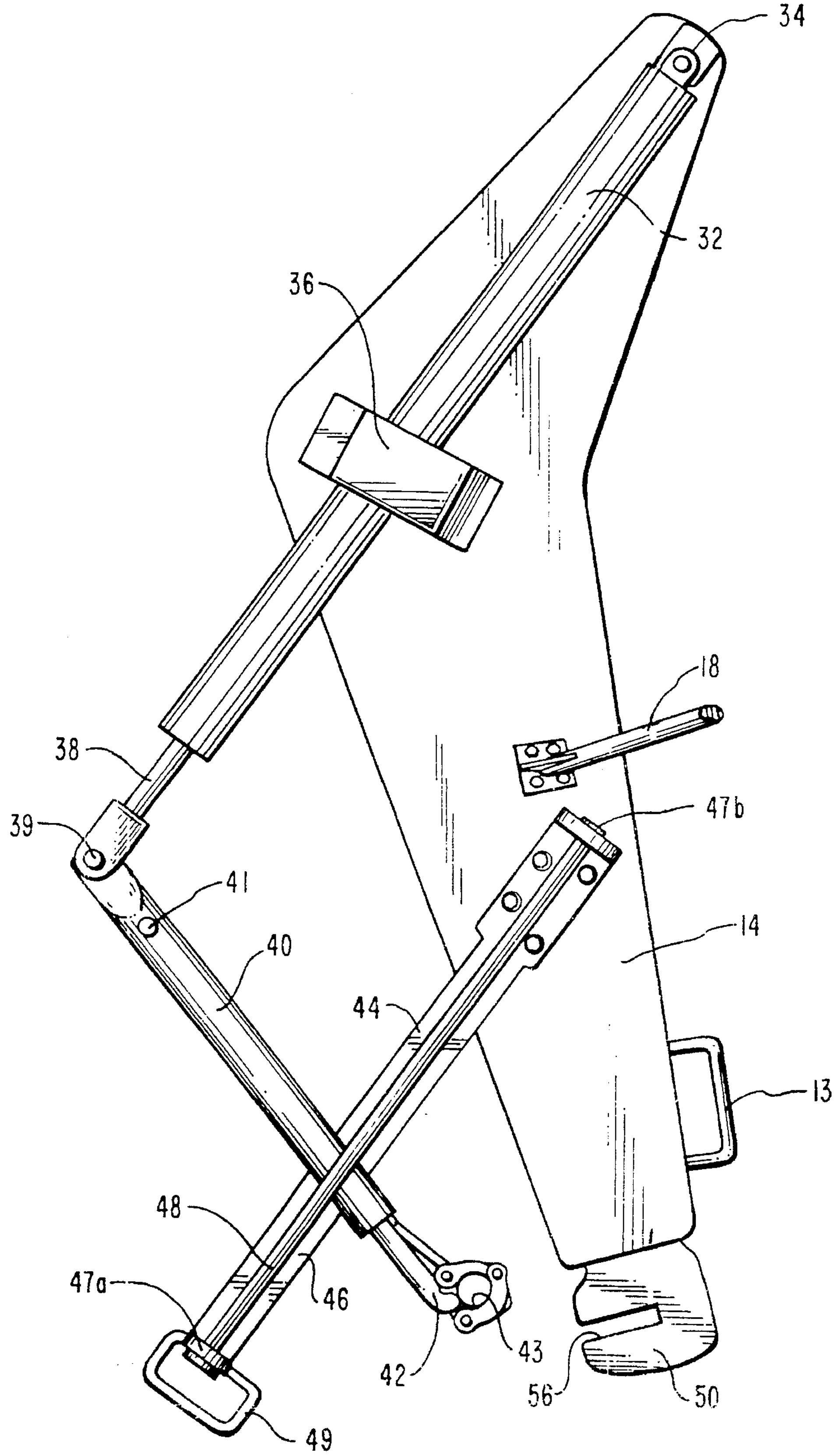
FIG. 2 is a plan view of the base plate and its associated elements.
Figure 3:
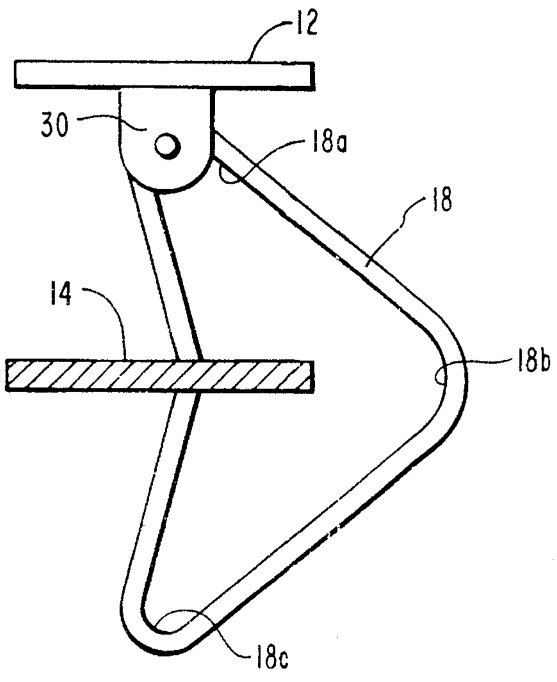
FIG. 3 is an enlarged, partial cross-sectional, schematic end view of the rollover bar and base plate shown in the orientation of FIGS. 1 and 2.
Figure 4:
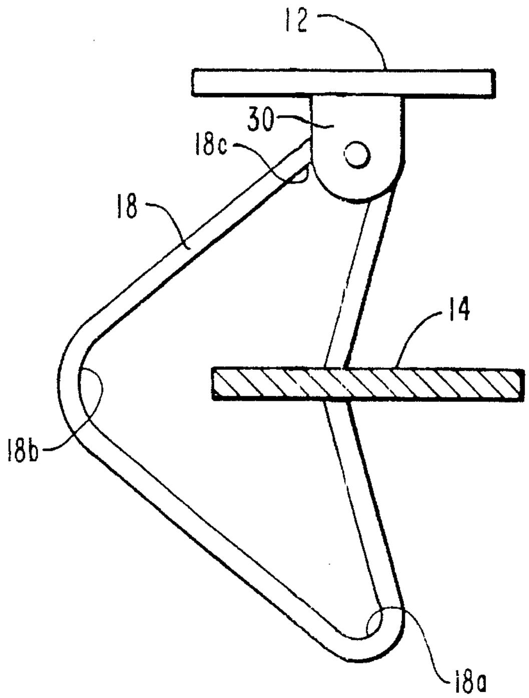
FIG. 4 is an enlarged, partial cross-sectional, schematic end view of the rollover bar and base plate shown inverted from the orientation shown in FIGS. 1–3.

With further reference to FIGS. 3 and 4, two of the three possible orientations of rollover bar 18 and base plate 14 are shown in these fragmentary, cross-sectional end views. Rollover bar 18 is configured with three lobes 18*a*–18*c* any one of which can be received in roller 30 to achieve the desired orientation of base plate 14. FIG. 3 shows base plate 14 in the orientation shown in FIGS. 1 and 2 with lobe 18*a* engaged in roller 30 whereas FIG. 4 shows base plate 14 in its inverted orientation with lobe 18*c* engaged in roller 30. Engagement of lobe 18*b* in roller 30 suspends base plate 14 in a vertical orientation (not shown). Importantly, regardless of whether base plate 14 is suspended from any of lobes 18*a*–18*c*, the functioning of rod coupling tool 10 remains the same. The particular orientation of baseplate 14 is determined by the particular configuration encountered in the sucker rod/rod coupling sequence encountered in sucker rod string 10. For example, as shown in FIG. 1, sucker rod string 20 is shown having the threaded joint break between lower sucker rod 24 and rod coupling 26. In the event rod coupling 26 is retained on the upper end of lower sucker rod 24 with the break being made between rod coupling 26 and upper sucker rod 22, base plate 14 will be inverted from the configurations shown in FIGS. 1–3 to that illustrated schematically at FIG. 4. Even though base plate 14 is inverted, all of the operative elements to be discussed more fully hereinafter operate in the same manner regardless of the particular orientation of base plate 14.

Referring again to FIGS. 1 and 2, base plate 14 has a wrench hydraulic cylinder 32 pivotally mounted thereto at pivot 34. A bracket 36 aligns wrench hydraulic cylinder 32 in a plane parallel to the plane of base plate 14 while permitting a limited degree of lateral movement while working with rod coupling tool 10. Bracket 36 is particularly designed to hold wrench hydraulic cylinder 32 in place when base plate 14 is inverted as described hereinbefore. A wrench piston 38 operates telescopically in wrench hydraulic cylinder 32 and terminates in a pivotal coupling 39. A hollow, tubular wrench receiver 40 is pivotally mounted at one end to pivotal coupling 39 and serves as a receiver for the handle of a friction wrench 42. A pin 41 releasably engages the end of the handle of friction wrench 42 inside wrench receiver 40. Pin 41 is removable to allow friction wrench 42 to be rotated to face the other direction when changing friction wrench 42 from an uncoupling mode to a coupling mode. Friction wrench 42 is a commercially available friction wrench and includes a grasping channel 43 therein for frictionally engaging rod coupling 26.

A guide assembly 44 is mounted to base plate 14 and includes a basal guide plate 46 with raised end plates 47*a* and 47*b* at each end. A retaining rod 48 is removably mounted between end plates 47*a* and 47*b* in spaced relationship to basal guide plate 46. Retaining rod 48 holds wrench receiver 40 in a plane parallel to the plane of base plate 14 when base plate 14 is inverted as discussed hereinbefore. A first handle 49 extends outwardly from the end of guide assembly 44 and serves as one handle for the manipulation of rod coupling tool 10. The location of first handle 49 at the end of guide assembly 44 provides the operator (not shown) with sufficient leverage to adequately manipulate rod coupling tool 10. A second handle 13 cooperates with first handle 49 to accommodate manipulation of rod coupling tool 10.

Figure 5:
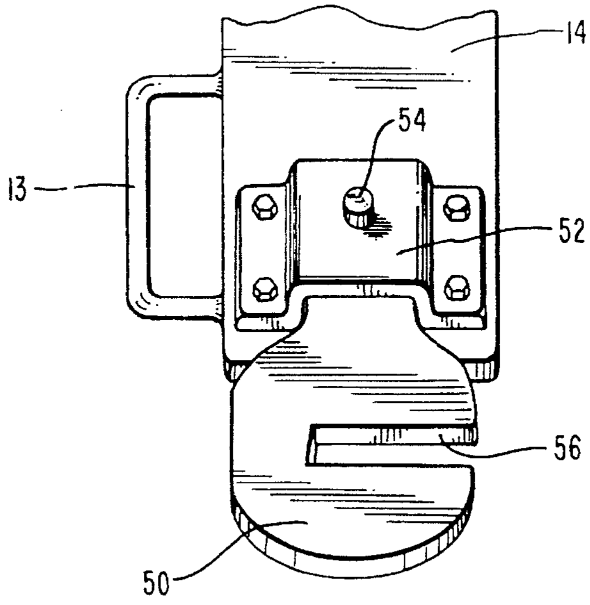
FIG. 5 is a fragmentary end view of the backup wrench.

Referring now also to FIG. 5, backup wrench 50 is releasably engaged to the end of base plate 14 by being slidingly received in an anchor bracket 52 mounted to one face of base plate 14 and held therein by a pin 54. Backup wrench 50 is configured with a fixed slot or jaw 56 cut in one side. The dimensions of jaw 56 are designed to receive wrench shanks 23 or 25 of sucker rod string 20. Backup wrench 50 is configured to be removed and either replaced or serviced when jaw 56 becomes worn as a result of usage particularly in light of the harsh usage to which it will be subjected during operation of rod coupling tool 10.

It should be noted at this point that backup wrench 50 and base plate 14 are shown in FIG. 5 as inverted from the their position shown in FIGS. 1 and 2. This position is the position achieved when rollover bar 18 is rotated to the position shown in FIG. 4 with lobe 18*c* engaged in roller 30. Accordingly, the orientation of backup wrench 50 shown in FIG. 5 is the orientation for backup wrench 50 if it were to be used to engage shank 23 with friction wrench 42 being used to engage rod coupling 26.

Control platform 12, as the name implies, serves as the platform for the hydraulic controls of rod coupling tool 10, that is, elevation control 60 and wrench control 62. Elevation control 60 controls the extension and retraction of a piston 17 operable in vertical cylinder 16. A hanger 15 on the end of piston 17 is used to suspend rod coupling tool 10 from an overhead hook of the workover rig (not shown).

Retracting and extending piston 17 raises and lowers, respectively, rod coupling tool 10. For example, pulling elevation control 60 allows pressurized hydraulic fluid to pass through a hydraulic line 64 into vertical cylinder 16 causing piston 17 to extend therefrom and thereby lowering rod coupling tool 10. Pushing elevation control 60 causes hydraulic fluid to pass through a hydraulic line 65 causing piston 17 to retract thereby raising rod coupling tool 10.

Correspondingly, pushing wrench control 62 sends hydraulic fluid through a hydraulic line 66 causing piston 38 to extend from cylinder 32. Pulling wrench control 62 sends hydraulic fluid through a hydraulic line 67 causing piston 38 to retract within cylinder 32. This linear movement of piston 38 creates a lever action against both wrench receiver 40 and friction wrench 42 engaged thereby. With shank 25 engaged by backup wrench 50, friction wrench 42 can be used to securely grasp rod coupling 26 to either break or tighten the threaded joint between these two elements. For example, assuming that threads of threaded pin 27 are securely engaged in corresponding threads (not shown) in rod coupling 26, shank 25 is engaged in backup wrench 50 while grasping channel 43 of friction wrench 42 is securely engaged about rod coupling 26. Wrench control 62 is then pushed to cause piston 38 to extend creating a powerful, yet controlled, torque between rod coupling 26 and threads 27. The joint is thereby safely and easily broken to permit rod coupling 26 to be unscrewed from sucker rod 24. Tightening of this joint is accomplished by screwing rod coupling 26 against threads 27 and then engaging friction wrench 42 to rod coupling 26 while piston 38 is extended. Pulling wrench control 62 retracts piston 38 creating leverage through wrench receiver 40 and friction wench 42 to securely tighten the joint between rod coupling 26 and sucker rod 24.

The single point suspension of rod coupling tool 10 on hanger 15 allows it to be easily pivoted incrementally in order to bring backup wrench 50 into engagement with either of wrench shanks 23 or 25, depending upon the particular orientation of rod coupling tool 10. Further, this free swinging capability of rod coupling tool 10 allows it also to be easily swung outwardly away from sucker rod string 20 while sucker rod string 20 is being raised and lowered as described hereinbefore.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of assembling a coupling tool for turning a threaded joint between a sucker rod and a coupling comprising:

affixing a backup wrench to a base plate at a first regular orientation;

suspending said base plate from a control platform;

mounting said base plate to an inversion loop and inverting said base plate by inverting said inversion loop;

pivotally mounting a hydraulic piston to said base plate at second angular orientation relative to said first angular orientation of said backup wrench;

releasably engaging a friction wrench to said hydraulic piston at one end and to the coupling at the other end;

engaging the sucker rod with said backup wrench;

frictionally seizing the coupling with said friction wrench; and twisting the coupling relative to the sucker rod by activating said hydraulic piston to rotationally move said friction wrench relative to said backup wrench.

2. The method defined in claim 1 wherein said suspending step includes mounting said control platform on an elevation piston, said elevation piston selectively positioning the elevation of said control platform.

3. The method defined in claim 1 wherein said suspending step includes mounting hydraulic control means on said control platform.

* * * * *